Feb. 24, 1948.  A. KORN ET AL  2,436,578
MEANS FOR ALTERING THE REFLECTION OF RADAR WAVES
Filed March 4, 1944

INVENTORS.
ARTHUR KORN.
JOSEPH W. HESS.
SIMON L. RUSKIN.
BY Edward Thomas

ATTORNEY.

Patented Feb. 24, 1948

2,436,578

UNITED STATES PATENT OFFICE 2,436,578

MEANS FOR ALTERING THE REFLECTION OF RADAR WAVES

Arthur Korn, Hoboken, N. J., and Joseph W. Hess and Simon L. Ruskin, New York, N. Y.; Adele Hess, administratrix of said Joseph W. Hess, deceased; Elizabeth P. Korn, administratrix of said Arthur Korn, deceased; assignors to said Ruskin Application March 4, 1944, Serial No. 524,999½

3 Claims. (Cl. 250—1.76)

It is known that radar measurements and calculations make it possible to locate objects, such as airplanes with respect to their distance, altitude and azimuth from a place of observation.

The radar methods are based on the laws governing the propagation of very short electric waves. Such waves are sent from the place of observation in the direction towards the object and reflected from this object. The reflected waves interfere with the original waves and from this interference a conclusion can be drawn in respect to the position of the moving object. Such measurements are for example also used for aiming antiaircraft guns against planes. Such attacks by guns are intended to destroy an aircraft before it drops its bombs or to destroy it so that it cannot get away safely and return with a fresh load of bombs.

The aforesaid radar methods having developed in this war in such a high degree that mass attacks of planes have to count in making with very large losses.

According to the present invention devices and methods are provided, whereby the measurements by radar become less readily detected. This method in general consists in making the radar waves sent from their source strike upon reflecting surfaces which contain certain electrically semi-conducting material whereby the reflected radar waves are altered and cause thereby erroneous radar measurements.

The composition of the electrically semi-conducting material and its structure, and also the method and devices for making less readily detected the customary radar measurements can be varied without changing the spirit of the invention.

In the following some examples for the composition of the electrically semi-conducting materials and the aforesaid methods and devices are described.

It has been found that one electrically semi-conducting material for the aforesaid purpose is cuprous oxide ($Cu_2O$) which can be used to advantage. The cuprous oxide can be applied in form of a layer on a very thin moldable copper sheet or wire by annealing the copper sheet or wire in a furnace in an atmosphere of oxygen at a temperature of approximately 800°–1000° Celsius.

It has been found that sensibly altered reflections of radio waves are obtainable by using a basic body of copper (sheet or wire) carrying layers of other materials such as silver, tin, gold and then subjecting this body to an annealing temperature by which cuprous oxide is obtained in one of the aforesaid metal laminations. By this process very sensible reflectors can be made with variations of the alterations of the reflections of the radio waves.

It has been further found that reflectors for altering the reflection of radar waves can be made of powdered cuprous oxide. Such powdered cuprous oxide is for example produced by annealing a mixture of copper chips made by filing, with black copper oxide in a covered crucible. This cuprous oxide powder after being compressed has good ductility and can if desired be drawn in form of wires.

It has been further found that reflectors for altering radio waves can be built of knitted or woven texture, plaited work or net work of wires, or strips having a surface of cuprous oxide or in their interiors cores or layers of cuprous oxide.

Reflectors for altering the reflection of radio waves can also be produced by embedding electrically semi-conducting material such as powder of cuprous oxide in pasty or liquid material, capable of being solidified or hardened after the embedding of electrically semi-conducting material. As such embedding masses can be used for example plastics, shellac, resins, glues and some oil paints.

It is advantageous to use for all the above applications pure electrolytic copper in the form of sheets, wires and powders.

Instead of cuprous oxide the metallic form of selenium and tellurium can be used for the construction of reflectors altering the reflection of radio waves. For the production of such reflectors, for example selenium in a very thin layer is joined by casting on a thin metal sheet or wire and then by annealing brought into its metallic modification.

The foregoing cuprous oxide and selenium and tellurium are the most conspicuous members of the group of electrically semi-conductors, which alter the reflection of radar waves efficiently.

By the aforesaid devices and methods the whole surface of a moving object or only a part of the surface and also metallic parts of complicated shape can be easily transformed into altering reflectors.

Although the invention as described above is clear in itself some examples of this invention may be illustrated in the annexed drawing schematically.

Fig. 2 shows in enlarged scale a section of the surface structure of a metal body painted with a compound of material containing semi-conducting matter in the form of powder or the like.

Figure 1:
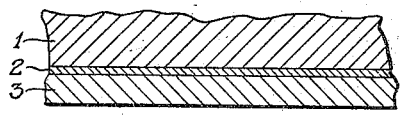
Fig. 1 illustrates in enlarged scale a section of the surface structure of a metal body plated with one layer of semi-conducting material.

In Fig. 1 the number 1 denotes a part of a metallic body from which radio waves are reflected. The body may be a metal sheet or a metal block for example of copper. The number 3 denotes a layer of cuprous oxide ($Cu_2O$). The number 2 denotes a zone of diffusion between the layer of cuprous oxide 3 and the surface of the copper body 1. This zone 2 is formed automatically during the above described annealing treatment of the copper body.

Figure 2:
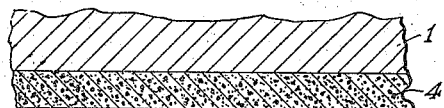

In Fig. 2 the number 1 denotes a part of a metal body, 4 particles of a powder of semi-conducting material such as cuprous oxide ($Cu_2O$) and 5 a solidified embedding mass for said particles consisting as above described for example of plastic, shellac, resins, glue or some oil paints.

Figure 3:
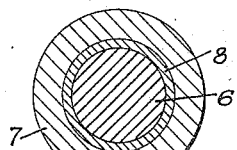
Fig. 3 illustrates a cross section through a wire plated with semi-conducting material.

In Fig. 3 the number 6 denotes a copper wire, 7 a layer of cuprous oxide ($Cu_2O$) and 8 the zone of diffusion between the layer of couprous oxide and the surface of the copper wire.

Figure 4:
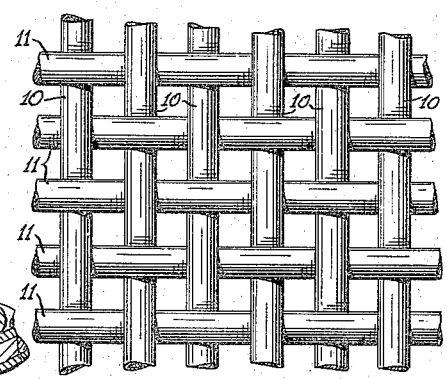
Fig. 4 is a top plan view of a network consisting of metal wires plated with semi-conducting material.
Figure 5:
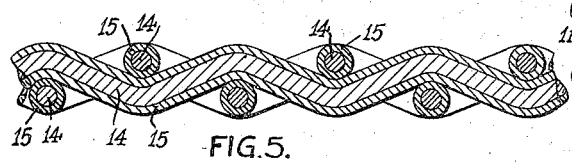
Fig. 5 is a cross section of the network as illustrated in Fig. 4.

In the Figs. 4 and 5 the number 10 denotes the warp wires and the number 11 the weft wires of the net work. Each of these wires comprises a metal core 14 consisting for example of copper and a covering layer 15 consisting of electrically semi-conducting material for example of cuprous oxide ($Cu_2O$).

Figure 6:
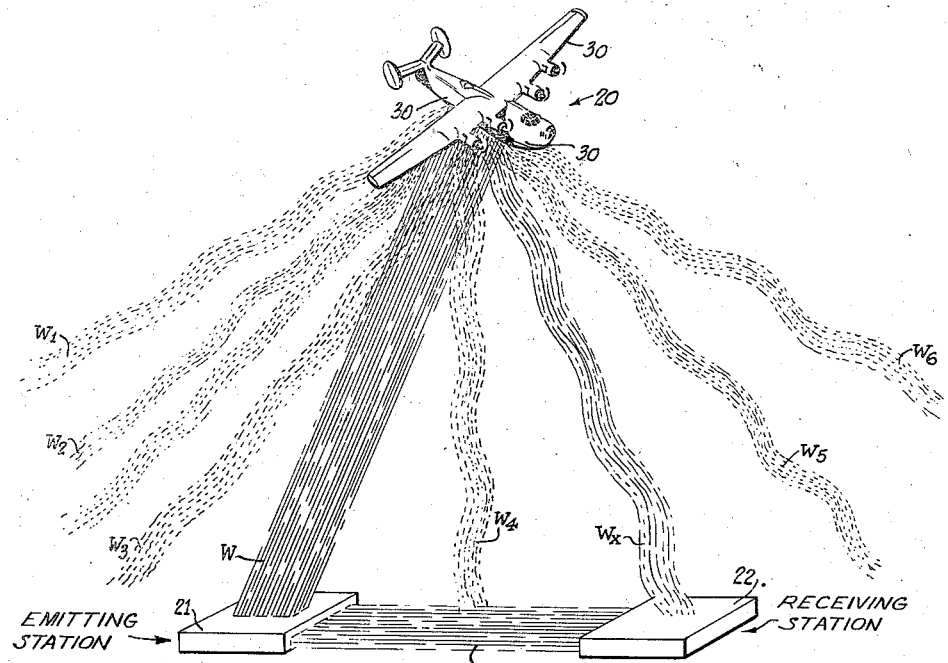
Fig. 6 illustrates in a schematical perspective view the principle of the invention.

In Fig. 6 the number 20 denotes an airplane, 21 a station emitting short radio waves $w$ and $v$ and 22 a station for the reception of the reflected short radio waves $w_x$ and the short radio waves $v$.

In the known radio units the station 22 has been ordinarily arranged either close to the emitting station 21 or some distance of it. By this known equipment and known location methods the position of an airplane, with a surface reflecting radar wave in normal manner, has hitherto been found.

According to the invention herein described the surface of parts of airplanes, wings and body are covered with a matter containing electrically semi-conducting material, adapted to alter the reflection of radio waves from the ordinary path of reflection. The short waves emitted by station 21 are reflected therefore according to the invention in altered manner by the surface of the plane. Thus the receiving station 22 fails to receive a normal amount of reflected radio waves from the airplane 20. As a result the correct calculation of position of the airplane is weakened, because waves are directed to $W_1$, $W_2$, $W_3$, $W_4$, $W_5$, $W_6$, for example.

Having thus described in some details certain embodiments of the invention what is claimed is:

1. The combination with a body forming a transport adapted to carry various loads and normally adapted to reflect radio waves, of a layer of metallic copper on the outer surface of said body and substantially covering it, and a second layer of cuprous oxide substantially covering it, so that said layers distort impinging radio waves.

2. The combination with a body forming a transport adapted to carry various loads and normally adapted to reflect radio waves, of a layer on the outer surface of said body selected from the group consisting of metallic copper and metallic silver, and a second layer selected from the group consisting of cuprous oxide and metallic selenium, so that said layers distort impinging radio waves.

3. The combination with an airplane having a surface material normally adapted to distort impinging radio waves, of a layer on said outer surface selected from the group consisting of metallic copper and metallic silver and a second layer selected from the group consisting of cuprous oxide and metallic selenium, so that said layers distort impinging radio waves.

ARTHUR KORN.
JOSEPH W. HESS.
SIMON L. RUSKIN.

REFERENCES CITED

The following references are of record in the file of this patent:

UNITED STATES PATENTS

| Number | Name | Date |
| --- | --- | --- |
| 1,243,654 | Clark | Oct. 16, 1917 |
| 1,919,988 | Rupp | July 25, 1933 |
| 2,046,153 | Dowling | June 30, 1936 |
| 2,103,358 | Gothe | Dec. 28, 1937 |
| 2,412,692 | Peters | Dec. 17, 1946 |

FOREIGN PATENTS

| Number | Country | Date |
| --- | --- | --- |
| 423,876 | Great Britain | Feb. 11, 1935 |
| 497,147 | Great Britain | Dec. 9, 1938 |